United States Patent
Newton

(10) Patent No.: US 10,991,280 B2
(45) Date of Patent: Apr. 27, 2021

(54) HEAD TRACKING BASED FIELD SEQUENTIAL SACCADIC BREAK UP REDUCTION

(71) Applicant: PURE DEPTH INC., Auckland (NZ)

(72) Inventor: John D. Newton, Auckland (NZ)

(73) Assignee: Pure Depth Limited

( * ) Notice: Subject to any disclaimer, the term of this patent is extended or adjusted under 35 U.S.C. 154(b) by 0 days.

(21) Appl. No.: 15/967,704

(22) Filed: May 1, 2018

(65) Prior Publication Data

US 2018/0315362 A1    Nov. 1, 2018

Related U.S. Application Data

(60) Provisional application No. 62/492,843, filed on May 1, 2017.

(51) Int. Cl.
  *G09G 5/02*   (2006.01)
  *G09G 3/00*   (2006.01)

(52) U.S. Cl.
  CPC ....... *G09G 3/003* (2013.01); *G09G 2300/023* (2013.01); *G09G 2320/0242* (2013.01); *G09G 2320/0666* (2013.01); *G09G 2354/00* (2013.01)

(58) Field of Classification Search
  None
  See application file for complete search history.

(56) References Cited

U.S. PATENT DOCUMENTS

| | | | |
|---|---|---|---|
| 4,530,004 A * | 7/1985 | Achiha | H04N 9/646 348/450 |
| 6,454,411 B1 | 9/2002 | Trumbull | |
| 8,970,495 B1 * | 3/2015 | Biffle | G09G 5/08 345/158 |
| 9,710,887 B1 * | 7/2017 | Sahlsten | G03B 21/142 |
| 2002/0101546 A1 * | 8/2002 | Sharp | G02B 27/288 348/760 |
| 2003/0053044 A1 * | 3/2003 | Popovic | G01J 1/42 356/218 |
| 2007/0035561 A1 | 2/2007 | Bachelder et al. | |
| 2007/0146242 A1 * | 6/2007 | Miller | G09G 3/2074 345/76 |

(Continued)

FOREIGN PATENT DOCUMENTS

| | | |
|---|---|---|
| EP | 2 854 403 A1 | 4/2015 |
| WO | WO 2016/105521 | 6/2016 |

OTHER PUBLICATIONS

Johnson et al., The Visibility of Color Breakup and a Means to Reduce It, 2014, Journal of Vision, 14(14):10, 1-13 (Year: 2014).*

(Continued)

*Primary Examiner* — Anh-Tuan V Nguyen
(74) *Attorney, Agent, or Firm* — Craig A. Baldwin

(57) ABSTRACT

A multi-layer display system for displaying 3D images with reduced saccadic breakup includes a plurality of display screens arranged in a substantially parallel and overlapping manner, and a processing system. The processing system is configured to minimize or prevent saccadic breakup of displayed images by detecting head and/or eye movement of a viewer, and accordingly controlling color saturation of display fields when movement of head and/or eye is detected.

15 Claims, 6 Drawing Sheets

(56) References Cited

U.S. PATENT DOCUMENTS

| | | | |
|---|---|---|---|
| 2007/0229533 A1* | 10/2007 | Dalal | H04N 9/3114 345/604 |
| 2010/0231603 A1* | 9/2010 | Kang | G09G 3/3426 345/591 |
| 2010/0289819 A1 | 11/2010 | Singh et al. | |
| 2011/0084893 A1 | 4/2011 | Lee et al. | |
| 2011/0310121 A1 | 12/2011 | Baron | |
| 2013/0083088 A1* | 4/2013 | Okita | G09G 3/3413 345/690 |
| 2013/0162766 A1 | 6/2013 | Cohen et al. | |
| 2013/0194389 A1* | 8/2013 | Vaught | G02B 27/017 348/47 |
| 2013/0335439 A1* | 12/2013 | Jeong | G09G 5/026 345/590 |
| 2014/0125789 A1* | 5/2014 | Bond | G02B 27/0149 348/77 |
| 2014/0184615 A1* | 7/2014 | Bergquist | G09G 5/02 345/503 |
| 2014/0292825 A1* | 10/2014 | Kim | G09G 3/003 345/690 |
| 2014/0340434 A1* | 11/2014 | El-Ghoroury | G09G 5/02 345/690 |
| 2015/0213634 A1* | 7/2015 | Karmarkar | G06T 11/60 345/589 |
| 2015/0309571 A1 | 10/2015 | Cheng et al. | |
| 2016/0147302 A1* | 5/2016 | Choi | G02B 27/017 345/156 |
| 2016/0246055 A1 | 8/2016 | Border et al. | |
| 2016/0321841 A1 | 11/2016 | Christen et al. | |
| 2016/0349503 A1* | 12/2016 | Grossmann | G02B 27/0012 |
| 2017/0042418 A1* | 2/2017 | Leinonen | A61B 3/0058 |
| 2017/0263046 A1* | 9/2017 | Patney | G06T 15/20 |
| 2017/0278122 A1* | 9/2017 | Kaehler | G06K 9/00979 |
| 2018/0120572 A1* | 5/2018 | Watanabe | G06K 9/00671 |
| 2018/0227630 A1* | 8/2018 | Schmidt | H04N 21/44218 |

OTHER PUBLICATIONS

Cheng, Interactive techniques for reducing color breakup, 2008, Proceedings of the 2008 workshop on Immersive projection technologies/Emerging display technologiges, pp. 1-4 (Year: 2008).*

Zhang et al., "A Field-Sequential-Color Display with a Local-Primary-Desaturation Backlight Scheme", Journal of SID, vol. 19, No. 3. Retrieved Apr. 26, 2018.

European Extended Search Report dated Oct. 13, 2020 for EP Application No. 18793841.0.

Extended European Search Report dated Dec. 7, 2020 for EP Application No. 18793822.0.

* cited by examiner

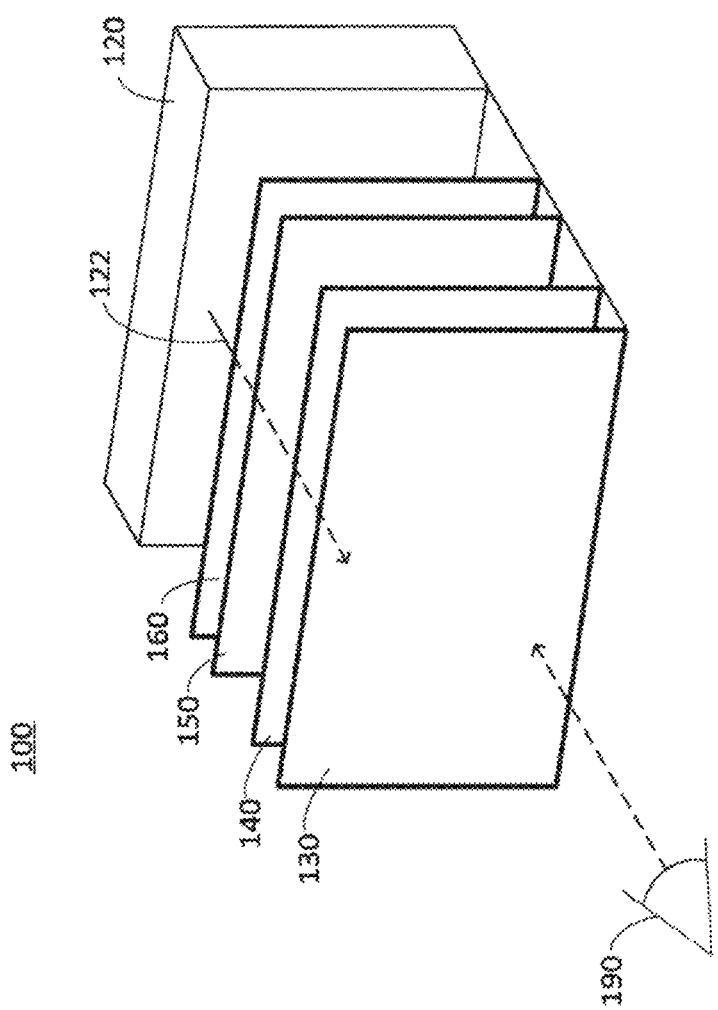

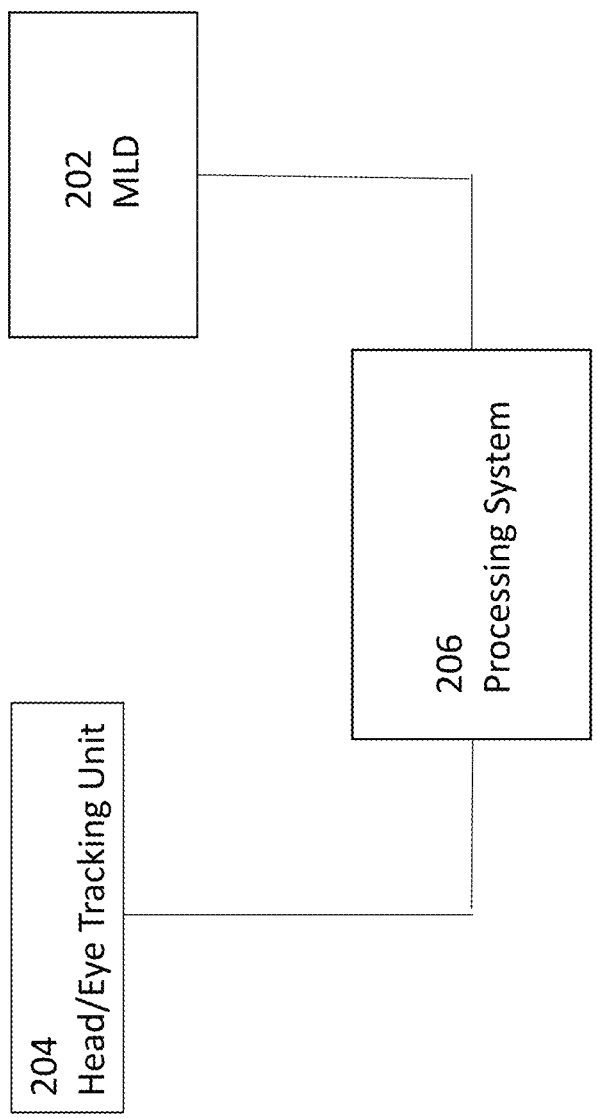

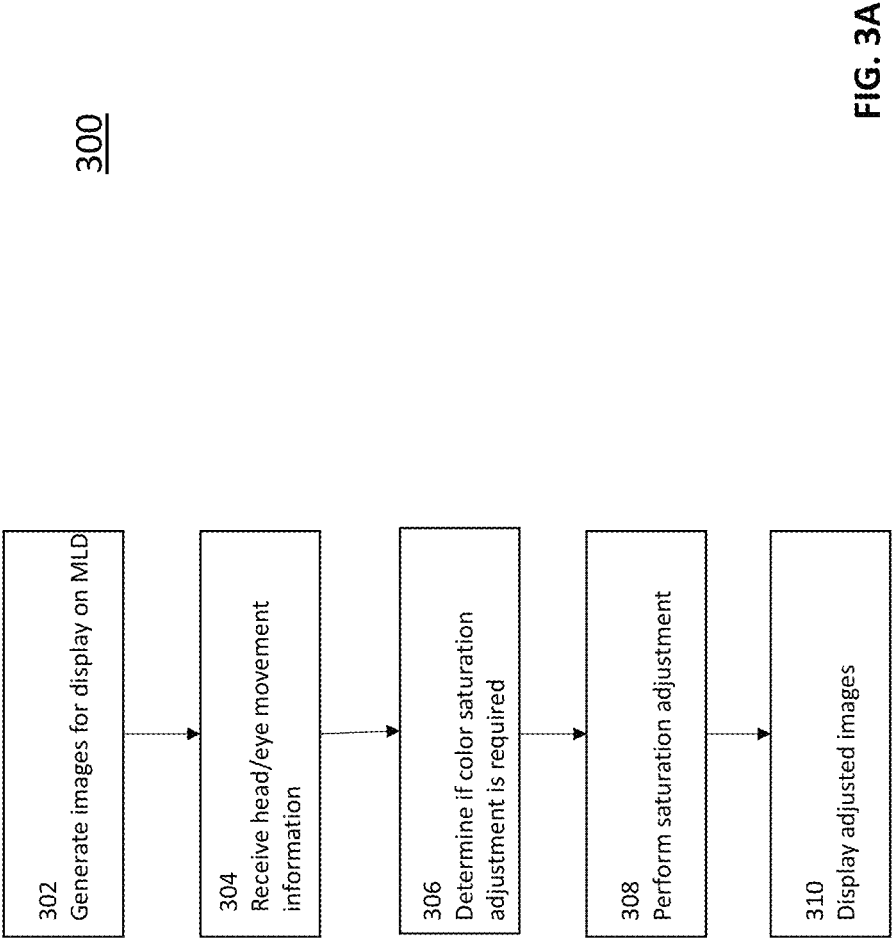

HEAD TRACKING BASED FIELD SEQUENTIAL SACCADIC BREAK UP REDUCTION

CROSS-REFERENCE TO RELATED APPLICATIONS

This application claims the benefit of priority to U.S. Provisional Patent Application No. 62/492,843 filed on May 1, 2017, the entire contents of which is hereby incorporated by reference.

BACKGROUND

This disclosure relates generally to displays and, more particularly, to display systems and methods for displaying images on multi-layer displays.

Image displays limited to a single two dimensional display lack depth information. That is, such displays do not relay depth information in the image to the viewer. To relay depth information of objects, there have been efforts to provide displays that can display the objects in three-dimensions. For example, stereo displays convey depth information by displaying offset images that are displayed separately to the left eye and the right eye. However, stereo displays are limited as to what angle an observer can view the display. In addition, stereo displays may cause various discomforting symptoms, such as eye strain, blurred vision, and double vision.

Multi-layer displays have been developed to display objects with a realistic perception of depth. Multi-layer display (MLD) systems are becoming popular for several applications such as, for example, vehicle dashboards, game machines, handheld devices and the like. MLD systems can be configured to display images of scenes so that depth can be represented by distributing objects to be displayed on to the separate display panels of the MLD. Example MLD systems are described in U.S. patent application Ser. No. 15/359,732 filed on Nov. 23, 2016, the contents of which is incorporated herein in its entirety.

In some display techniques, such as in field sequential display, in order to display an image, the eye would be presented with red, green and blue images in rapid succession time sequence. When the viewer is stationary, the red, green and blue images of the same image, all impose at the same position of the retina, and the viewer sees the intended image in the intended color. However, saccadic breakup, which manifests as small images of the red, green and blue fields shown on the retina when the viewer's head moves, ruins or degrades the viewing experience in some instances and may produce color fringes etc.

SUMMARY

Exemplary embodiments provide a display system that can provide visual depth information using a multi-layer display including two or more display screens (e.g., LCDs) and/or layers provided in a stacked arrangement with improved viewability. Visual depth information of displayed objects may be provided by displaying corresponding gradients on multiple display screens. Improved viewability may be provided by automatically controlling color saturation of display fields in accordance with movements of the viewer's head and/or eye so that saccadic breakup is either reduced or eliminated.

In another exemplary embodiment, there may be provided a non-transitory computer-readable storage medium having stored therein a program for execution in a processing system of a display system. The program, when executed, may cause the processing system to control a first display screen to display a first image and a second display screen arranged in an overlapping manner with the first display screen to simultaneously display a second image, to detect head and/or eye movement of a viewer, to determine color saturation values for one or more display fields of at least one of the first or second images in accordance with the detected movement, to adjust the at least one of the first or second images using the determined color saturation values, and to display the adjusted at least one first and second images simultaneously on the display screens.

BRIEF DESCRIPTION OF THE DRAWINGS

So that features of the present invention can be understood, a number of drawings are described below. It is to be noted, however, that the appended drawings illustrate only particular embodiments of the invention and are therefore not to be considered limiting of its scope, for the invention may encompass other equally effective embodiments.

FIG. 1 schematically illustrates a multi-layer display according to some example embodiments of the present disclosure.

FIG. 2 schematically illustrates a display system according to some example embodiments of the present disclosure.

FIG. 3A illustrates a flowchart representing a method for displaying information on a multi-layer display system according to some example embodiments of the present disclosure.

DETAILED DESCRIPTION

Figure 3B:
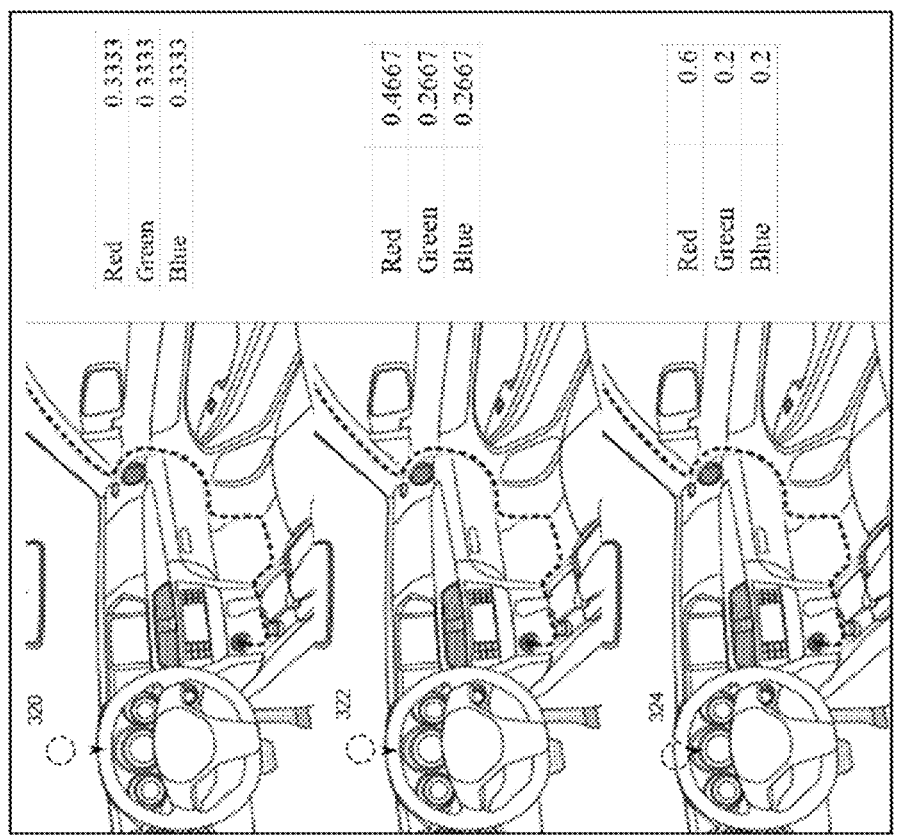
FIGS. 3B and 3C schematically illustrates the changing of a tracked view point and corresponding example color saturations to address saccadic breakup effects.

MLD systems include multiple separate display screens (also referred to as display layers or display panels). As described in the above incorporated patent application, an observer views a composite image of a scene displayed on the MLD system, whereas the composite image is the visual appearance to the observer of separate images of various portions of the scene displayed on respective display screens of the MLD system. Example embodiments of the present disclosure detect head and/or eye movement of the viewer, and accordingly adjusts color saturation of display fields of one or more of the images displayed on the respective display screens in order to minimize or eliminate the saccadic breakup that occurs in the presence of head and/or eye movements.

FIG. 1 illustrates a MLD system 100 according to some example embodiments of the present disclosure. The display system 100 may include a light source 120 (e.g., rear mounted light source, side mounted light source, optionally with a light guide), and a plurality of display screens 130-160. The display screens 130-160 may be disposed substantially parallel or parallel to each other and/or a surface (e.g., light guide) of the light source 120 in an overlapping manner. In one embodiment, the light source 120 and the display screens 130-160 may be disposed in a common housing. It will be understood that, in some example embodiments, MLD 100 may include only two display screens, and may or may not include a light source 120 (e.g., a light source may be external to the housing of the MLD system). The MLD 100 may be provided at the dash of a vehicle in some example embodiments of this disclosure, in order to show the viewer (observer) images such as a speedometer, gauges such as oil pressure or fuel level gauges, navigation, etc. It should be appreciated that the elements illustrated in the figures are not drawn to scale, and thus, may comprise different shapes, sizes, etc. in other embodiments. It should also be appreciated that vehicular dashboards are only one application for MLD systems, and that the use of MLD systems as displays for portable devices, game displays, advertising displays, etc., are contemplated in example embodiments.

In an example application of displaying a three dimensional (3D) effect using an MLD system, the MLD system 100 may display graphical information to a viewer/observer 190, such as an operator or passenger of a vehicle, by displaying information including a gradient on two, three, or more of the display screens 130-160 simultaneously. To mimic depth cues of the displayed object, portions of the same object can be displayed with different gradients of a given color or the like on different display screens 130-160. For example, each of the display screen 130-160 may be controlled to display a different portion of a gauge and/or needle found in a traditional vehicle instrument panel. In certain embodiments, each of the display screen 130-160 may be controlled to display a different portion of an image (e.g., clock, gauge and/or needle(s)) of a watch device to be worn on the wrist of a user, or the like.

In one example application of display system 100, gradients can be used to better show sloped/inclined surfaces to a viewer in a three dimensional manner using display system 100. An example gradient would fade from a dark color (e.g., dark grey) at the front of the display apparatus to a light color (e.g., light grey) at or near the rear of the display apparatus, in order to better show a three dimensional image of a movable needle (e.g., speedometer needle, oil pressure needle, RPM needle, clock needle, temperature needle, fuel level needle, etc.) to an operator of the vehicle, or vice versa. For instance, the main body of a needle may be a darkest color (e.g., black or dark grey) as shown by the display panel 130 closest to the viewer, and sides or edges of the needle may get progressively lighter of that color (e.g., lighter grey or white) in display panels 140, 150 moving further rearward away from the viewer, such that the lightest version of that color (lightest grey) would be emitted from the rear-most display panel 160 for very edges/sides of the needle. The opposite gradient may also be provided, in particular the main body of a needle may be a light color (e.g., white or light grey) as shown by the display panel 130 closest to the viewer, and sides or edges of the needle on the inclined surface may get progressively darker (e.g., to dark grey or black) in display panels 140, 150 moving further rearward away from the viewer, such that the lightest level would be emitted from the forward-most display panel 160 for that object having an inclined surface. Another example gradient could be used to display the rim around a gauge needle, and would fade the rim color from a dark color (e.g., dark grey) at the front of the display apparatus to a light color (e.g., light grey) at or near the rear of the display apparatus (or vice versa), in order to better show a three dimensional image of the rim to an operator of the vehicle. For instance, a portion of the rim closest to the viewer may be a darkest color (e.g., dark grey) as shown by the display panel 130 closest to the viewer, and the body of the rim moving rearward may get progressively lighter of that color (e.g., lighter grey) in display panels 140, 150 moving further rearward away from the viewer, such that the lightest version of that color (lightest grey) would be emitted from the rear-most display panel 160 for the rearmost portion of the rim. Of course, the gradient could be arranged in the opposite manner for the rim, so that the lightest color (e.g., grey) is for the portion of the rim closest to the viewer and the darkest color (e.g., grey or black) is for the portion of the rim farthest from the viewer. The gradients above refer, for example, to dark and light colors forming gradients, where for example the darkest color may be at the center of an object displayed by a first panel and a lightest or lighter color may be provided at an outer part of the object for another panel (or vice versa). The darker color is generally desired to be opaque or substantially opaque, while the lighter color may or may not be transparent or substantially transparent from the point of view of the viewer.

The light source 120 may be configured to provide illumination for the display system 100. The light source 120 may provide substantially collimated light 122 that is transmitted through the display screens 130-160. Optionally, the light source 120 may provide highly collimated light using high brightness LED's that provide for a near point source. The LED point sources may include pre-collimating optics providing a sharply defined and/or evenly illuminated reflection from their emission areas. The light source 120 may include reflective collimated surfaces such as parabolic mirrors and/or parabolic concentrators. In one embodiment, the light source 120 may include refractive surfaces such as convex lenses in front of the point source. However, the LEDs may be edge mounted and direct light through a light guide which in turn directs the light toward the display panels in certain example embodiments.

Each of the display panels/screens 130-160 may include a liquid crystal display (LCD) matrix. Screens are usually stacked LCD layers within a single pair of cross polarizers on the external facing surfaces if the panels are LCD or just stacked with transparent LED or OLED technologies. The rear most display layer may be a non-transparent technology. The LCD layers may be Twisted Nematic+Film, Vertically aligned, Patterned Vertical Alignment, in plane switching, Transparent OLED, Transparent Direct View Micro LED Displays. Alternatively, the display screens 130-160 may include organic light emitting diode (OLED) displays, transparent light emitting diode (TOLED) displays, cathode ray tube (CRT) displays, field emission displays (FEDs), field sequential display or projection displays. In one example embodiment, the display panels 130-160 may be combinations of either full color RGB, RGBW or monochrome panels. The display screens 130-160 are not limited to the listed display technologies and may include other display technologies that allows for the projection of light. In one embodiment, the light may be provided by a projection type system including a light source and one or more lenses and/or a transmissive or reflective LCD matrix.

In one embodiment, each of the display screens 130-160 may be approximately the same size and have a planar surface that is parallel or substantially parallel to one another. In another embodiment, one or more of the display screens 130-160 may have a curved surface. In one embodiment, one or more of the display screens 130-160 may be displaced from the other display screens such that a portion of the display screen is not overlapped and/or is not overlapping another display screen.

Each of the display screens 130-160 may be displaced an equal distance from each other in example embodiments. In another embodiment, the display screens 130-160 may be provided at different distances from each other. For example, a second display screen 140 may be displaced from the first display screen 130 a first distance, and a third display screen 150 may be displaced from the second display screen 140 a second distance that is greater than the first distance. The fourth display screen 160 may be displaced from the third display screen 150 a third distance that is equal to the first distance, equal to the second distance, or different from the first and second distances.

The display screens 130-160 may be configured to display graphical information for viewing by the observer 190. The viewer/observer 190 may be, for example, a human operator or passenger of a vehicle, or an electrical and/or mechanical optical reception device (e.g., a still image, a moving-image camera, etc.). Graphical information may include visual display of objects and/or texts. In one embodiment, the graphical information may include displaying images or a sequence of images to provide video or animations. In one embodiment, displaying the graphical information may include moving objects and/or text across the screen or changing or providing animations to the objects and/or text. The animations may include changing the color, shape and/or size of the objects or text. In one embodiment, displayed objects and/or text may be moved between the display screens 130-160. The distances between the display screens 130-160 may be set to obtain a desired depth perception between features displayed on the display screens 130-160.

In one embodiment, a position of one or more of the display screens 130-160 may be adjustable by an observer 190 in response to an input. Thus, an observer 190 may be able to adjust the three dimension depth of the displayed objects due to the displacement of the display screens 130-160. A processing system may be configured to adjust the displayed graphics and gradients associated with the graphics in accordance with the adjustment.

Each of the display screens 130-160 may be configured to receive data and display, based on the data, a different image on each of the display screens 130-160 simultaneously. Because the images are separated by a physical separation due to the separation of the display screens 130-160, each image may be provided at a different focal plane and depth is perceived by the observer 190 in the displayed images. The images may include graphics in different portions of the respective display screen.

While not illustrated in FIG. 1, the display system 100 may include one or more projection screens, one or more diffraction elements, and/or one or more filters between an observer 190 and the projection screen 160, between any two projection screens 130-160, and/or the projection screen 130 and the light source 120.

Liquid crystal displays, such as those that may be used in MLD 100, have very low transmission. In some embodiments, they start with a white backlight and for each subpixel, transmit approximately ⅓ of the original spectral energy. There may be additional losses due to polarization, ITO coatings, aperture ratio etc. One solution to increase the throughput of these display systems is to use monochrome display screens and quickly flash the red, green and blue fields in succession. This is successful when the viewer's eyes are still. However, as noted above, saccadic breakup, which manifests as small images of the red, green and blue fields shown on the retina when the head moves, may ruin or degrade the viewing experience. In other words, movements of the viewer's head or eyes may cause the respective red, green and blue images in the succession to fall at spatially separated locations of the retina, thus creating color fringes etc. around a bright object in the viewed image.

Some previous approaches to address saccadic breakup used blue phase LCDs and/or used low resolution backlights. However, blue phase liquid crystal displays are not commercially available since the material is still under development. Creating a low resolution backlight requires 3× the number of LED dies, and individual addressing of each LED die. The algorithm still leaves some visible residual breakup. In embodiments of the present invention, the head and/or eye movements are tracked, and the movement is used to control/adjust color saturation values such that saccadic breakup does not disrupt the viewing experience.

A head and/or eye movement tracking unit may be integrated into an MLD system such as that shown in FIG. 1. For example, such a unit can be incorporated in the first display screen in a manner that is visible or invisible to the viewer.

U.S. patent application Ser. No. 15/359,732 filed on Nov. 23, 2016, the contents of which is incorporated herein in its entirety, described an example MLD that may be used in some example embodiments. U.S. application Ser. No. 15/409,711 filed on Jan. 19, 2017, which is incorporated by reference in its entirety, describes an example MLD adapted to reduce moire interference. US Provisional Patent Application No. 62/469 filed on Mar. 9, 2017, which is also herein incorporated in its entirety, provides an MLD adapted for improved reliability and which may be used in some embodiments.

FIG. 2 schematically illustrates another example display system with an MLD 202, a head/eye tracking unit 204, and a processing system 206. MLD 202 can be an MLD such as the MLD 100 described above in relation to FIG. 1. The head/eye tracking unit 204 tracks movements of one or more of the head and eyes of a viewer, and communicates the movement information to processing system 206. In some embodiments, the tracking unit 204 may be integrally incorporated in, and within a single housing with, the MLD 202. In some embodiments, the tracking unit 204 may be separate from the MLD 202 and statically attached to something so that it can detect movements of the viewer's head and/or eyes. In yet other example embodiments, the tracking unit 204 is attached to the viewer's head or otherwise "worn" by the viewer. The communication between the tracking unit 204 and the MLD 202 and/or communication between the tracking unit 204 and processing system 206 may be wireless or wired using any form of compatible communication. The processing system 206 is configured to perform image generation for displaying on MLD 202, and upon receiving head/eye movement information of a viewer, may adjust aspects such as, but not limited to, color saturation of display fields of images that are to be displayed on any of the respective display screens of MLD 202.

FIG. 3A illustrates a process 300 for displaying information on a MLD system according to some example embodiments of the present disclosure. Process 300 may be performed by a processing system including one or more hardware processors and memory. For example, process 300 may be performed by a processing system of MLD system 100 shown in FIG. 1 and/or the display system 200 shown in FIG. 2. According to some example embodiments, process 300 includes operations 302-310. Persons of skill in the art will understand that, in some example embodiments, the order of operations of process 300 may be different, one or more operations may not be performed, and/or one or more additional operations may be performed.

After process 300 is entered, at operation 302, one or more images are generated for simultaneously displaying on the respective display screens of an MLD such as any of the MLDs described in relation to FIGS. 1 and 2 above. Process 300 may occur while the MLD is displaying, using received display data, a first image on a first display screen, and a second image on a second display screen arranged in an overlapping manner with the first display screen. The received display data may be retrieved for display from memory coupled to a processing system and/or from another device. The display data may be received over a network which may, but is not required to, be wireless. The received display data may include a plurality of images for display on different display screens of the MLD simultaneously. Each of the images may include a graphic and/or a gradient portion. In one embodiment, one or more of the images may include a plurality of graphics and each of the graphics may be separate from each other. The display data may include a sequence of images (e.g., video frames or other images) and/or text for display on the one or more display screens. Each of the images may include one or more of objects, text, and/or animations. The display data may be periodically or continuously received with updated information for display.

In one embodiment, the received display data may include a single image and the first and second images may be generated from the single received image. For example, the processing system may segment the received image to provide different portions of the received image to be displayed on the first and second display screens. The processing system may further generate gradients to be displayed on at least the first and second display screens to display features with a perception of three-dimensions due to the displacement of the display screens.

The first image may include a gradient area and the second image may include a gradient area that corresponds to the first gradient area. The first gradient area and the second gradient area may at least partially overlap. In another embodiment, the first gradient area and the second gradient area may be displayed without overlapping when viewed from a direction perpendicular to a focal plane of the first or second display screen. The first gradient area and the second gradient area may include portions of the same object in a scene, that when displayed in the separate screens as planar graphics with different gradients, is perceived by the observer as an object having a depth dimension.

At operation 304, the processing system receives information regarding head and/or eye movement of the viewer. The head and/or eye movement information may be concurrently received with the receiving of images. As noted in relation to FIG. 2, the head/eye tracking may be performed in accordance with a known system for tracking head and/or movements. The head/eye movement information may be received from a head/eye tracking unit such as the one described above in relation to FIG. 2. In some embodiments, the movement information provides one or more of a starting coordinate and angle of orientation, and an ending coordinate and orientation, a rate of change/movement and a direction, etc. The system may correlate the received movement information to one or more received images, such that, one or more of a magnitude, a direction, and a rate of change of the viewer's head and/or eye movement can be associated with respective images.

An example head tracking system may consist of a structured light generator and a pair of stereo cameras. In one embodiment the structured light system projects a series of regularly spaced dots onto the image. Each respective camera images the respective dots on the scene. The relative displacement of each respective dot between the camera images determines the distance of the dot from the camera pair. Dots that are in the far field have smaller displacement than those dots nearer the system. Since a depth field for the face can be captured, and features on the face can be identified (e.g., eyes and nose for example), it is possible to determine the head pose and therefore where the person is looking.

In an example gaze tracking system the direction the eye is looking in can be determined by the displacement centroid of the pupil from its normal position and the shape of the pupil since it will become more elliptical as it moves further from the normal position. Additional information about the gaze direction may be determined by whether the pupil becomes more elliptical in the horizontal or vertical axis. If the pupil ellipse elongates in the vertical axis the pupil has rotated horizontally, and if the ellipse elongates in the horizontal axis the pupil has rotated vertically.

At operation 306, the processing system determines whether adjustment of color saturation is required for display fields of images to be displayed on each display screen. This determination may be based upon an initial determination regarding any of current display configuration settings, the type of image, the current color saturation values for the respective images, etc. The determination may also be based, in addition to or in place of the above characteristics of a particular one or more images, on characteristics of the head and/or eye/gaze movement associated with the images. The movement characteristics may include start/end positions of a viewpoint of the viewer associated with an image, a magnitude of the head/eye movement associated with an image, a rate of movement, and the like. The problems of saccadic breakup in field sequential displays can be solved for a single viewer with the use of head-tracking, whereby the color saturation of the display fields is reduced when the head and/or eye is moving so as to reduce or completely eliminate the saccadic breakup problem. In some embodiments, the determination as to whether color saturation changes are required for reducing/eliminating saccadic breakup may be made based on a predetermined set of the above listed image characteristics and/or movement characteristics. For example, any one or more of the above listed characteristics associated with a particular image may be compared to one or more predetermined thresholds in order to determine whether changes to color saturation is required for purposes of reducing/eliminating saccadic breakup. In some embodiments, one or more display fields or objects for which color saturation is to be changed may be identified in an image. For example, certain display critical information (e.g., certain automotive dashboard gauges, meters, etc.) may be identified based upon a pre-configured list or the like, so that they can continue to be made clearly visible to the viewer with little or no saccadic breakup even during head/eye.

Some of these items are typically of high saturation, that is pure red green or blue colors. Since the light from each of these items is only present in one field adjustments to these items may not be necessary. However safety items that are important but not critical that are normally a blend of red, and blue for example speed gauges, and could be rendered in a single color so as not to cause breakup.

If at operation 306, it is determined that color saturation adjustment is needed or is desirable, then at operation 308, color saturation adjustment is performed. In some embodiments, the magnitude of the change to the values made to the color saturation may be based upon a rate of movement and current saturation values. In another embodiment, the change to saturation values may be determined, in addition to or instead of the rate of movement, by any of the magnitude of movement, viewpoint and/or change in the view angle. Other factors, such as the distance between respective display screens in the multi-layer display, and the respective amounts of light on the respective screens, may also be used in determining the magnitude and/or the specific color saturation values. The saturation applied to a particular display field or set of display fields in an image may differ based on where that image is to be displayed (e.g., on which display screen of the multi-layer display the image is to be displayed). The color saturation adjustment of the corresponding red, blue and green images may or may not be equal.

Figure 3C:
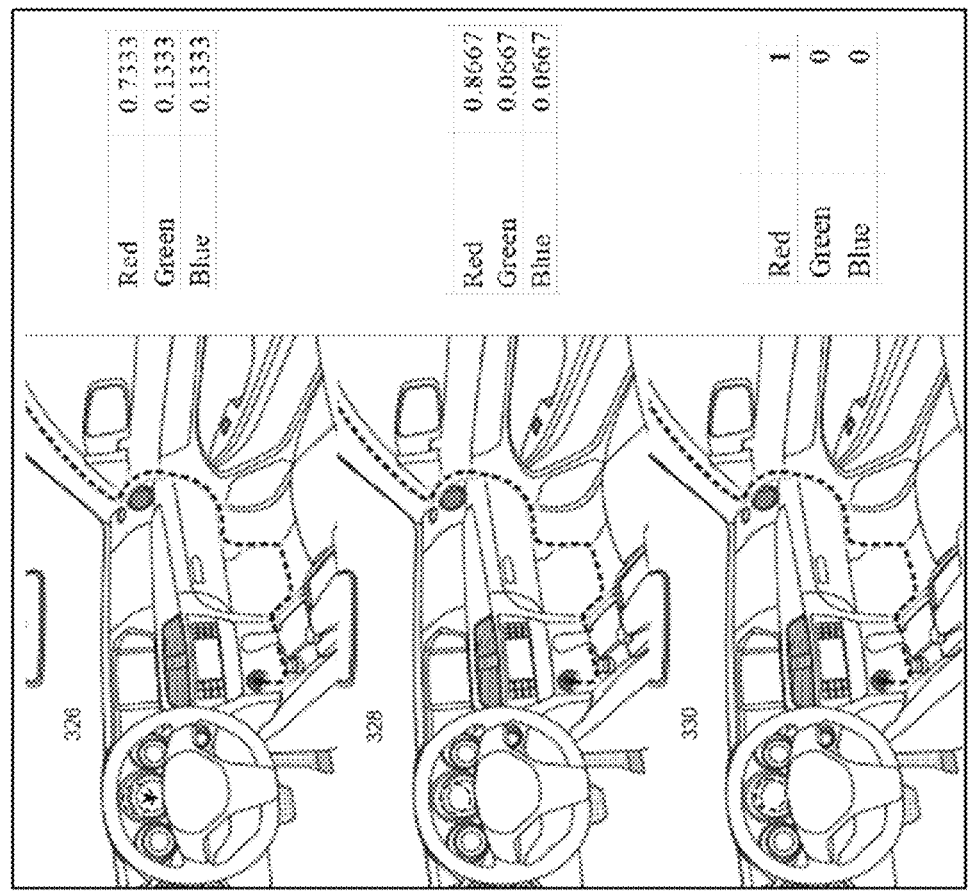

In one embodiment the field sequential system may be used within the car instrument cluster display. FIGS. 3B and 3C schematically illustrates the changing of a tracked view point towards a car instrument cluster display and corresponding example color saturations to address saccadic breakup effects.

In this example, the driver spends much of the time looking towards the road through the windscreen. The driver, will at intervals, periodically check his or her speed, and the eyes will move from the road down towards the instrument cluster. The eyes will dwell for a small period to check the speed of the car and then move upwards again towards the road. In this case the rotation of the eyes is primarily downwards and upwards. The risk for saccadic breakup occurring is highest during the transition as the eyes move downwards towards the instrument cluster 320 to 330 (see FIGS. 3B and 3C), and again when the eyes move up towards the windscreen. However, for the viewer not to detect the transition from monochrome to field sequential it would be desirable for the transition to be gradual. A high-speed camera may be looking at the eye pupils and determine if the eyes are beginning to move towards the instrument cluster. If pupils show a predetermined threshold of vertical movement (e.g., between three and five frames of vertical movement) the display will begin to transition from low saturation mode to high saturation mode. If the display can display one hundred individual fields per second, each field being composed of a red green and blue image frame, then there are approximately twenty frames, or about six fields available for transition from minimally to maximally saturated frames. So, considering just the red field for purposes of example, the relative intensity of each primary in the red frame would change as shown in the following table (which describes the image sequence 320-330 shown in FIGS. 3B and 3C.

quickly flashing the red, green and blue field in succession, with the color saturation values in respective display fields adjusted in accordance with movements of the viewer's head and/or eyes.

Modification of the displayed images may be made in response to instructions received from an observer or instructions from a processing system. The instructions may include reducing or increasing the depth of displayed objects. The depth of displayed objects may be increased by using additional display screens to display the objects. For example, to increase the perceived depth, a portion of an object displayed on one display screen may be moved to an overlapped display screen that is further away from the observer and a gradient may be displayed in place of the object. In another embodiment, a portion of an object displayed on one display screen may be moved to an overlapping display screen that is closer to the observer and a gradient may be displayed in place of the object.

After the displaying, process 300 may terminate.

Figure 4:
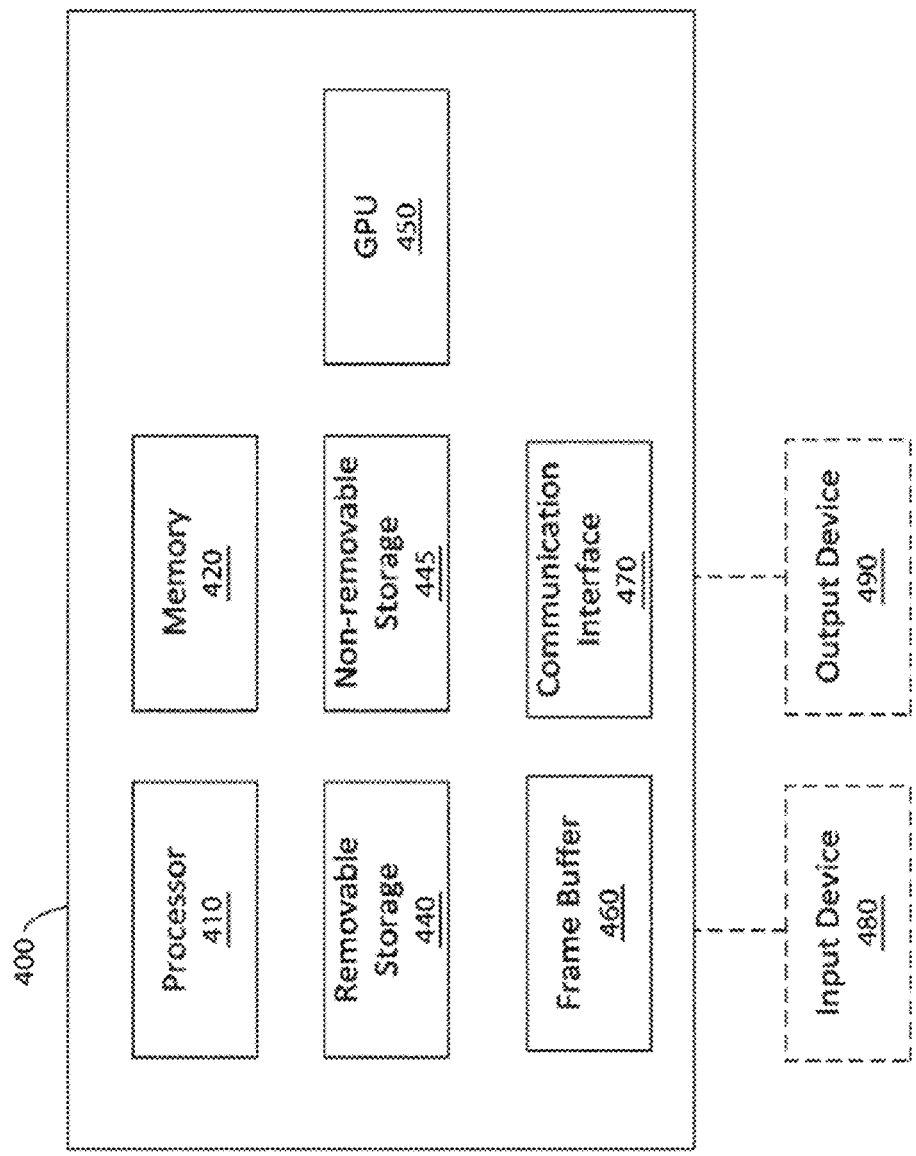
FIG. 4 illustrates an exemplary processing system upon which embodiments of the present disclosure(s) may be implemented, such as FIGS. 1-3.

FIG. 4 illustrates an exemplary processing system 400 using which embodiments of the present disclosure(s) may be implemented. The processing system 400 may include one or more processors 410 and memory 420. The processor 410 may comprise a central processing unit (CPU) or other type of processor. Depending on the configuration and/or type of computer system environment, the memory 720 may comprise volatile memory (e.g., RAM), non-volatile memory (e.g., ROM, flash memory, etc.), or some combination of the two. Additionally, memory 420 may be removable, non-removable, etc.

In other embodiments, the processing system may comprise additional storage (e.g., removable storage 440, non-removable storage 445, etc.). Removable storage 440 and/or non-removable storage 445 may comprise volatile memory, non-volatile memory, or any combination thereof. Additionally, removable storage 440 and/or non-removable storage 445 may comprise CD-ROM, digital versatile disks (DVD) or other optical storage, magnetic cassettes, magnetic tape, magnetic disk storage or other magnetic storage devices, or any other medium which can be used to store information for access by processing system 400.

As illustrated in FIG. 4, the processing system 400 may communicate with other systems, components, or devices via communication interface 470. Communication interface 470 may embody computer readable instructions, data structures, program modules or other data in a modulated data signal (e.g., a carrier wave) or other transport mechanism.

| Image | 320 | 322 | 324 | 326 | 328 | 330 |
|---|---|---|---|---|---|---|
| time | 0 s | 0.04 s | 0.08 s | 0.12 s | 0.16 s | 0.2 s |
| Red | 0.3333 | 0.4667 | 0.6000 | 0.7333 | 0.8667 | 1.0000 |
| Green | 0.3333 | 0.2667 | 0.2000 | 0.1333 | 0.0667 | 0 |
| Blue | 0.3333 | 0.2667 | 0.2000 | 0.1333 | 0.0667 | 0 |

At operation 310, the image or respective images are displayed on the MLD. One or more of the respective images displayed may have had their initial color saturation values for display fields changed in accordance with movement information received from the tracking unit. The display of the image with color saturation adjusted in accordance with the head/eye movement of the user, would result in an image display having saccadic breakup substantially reduced or eliminated.

The displaying may be performed by using monochrome displays in the MLD (e.g., the monochrome displays corresponding to respective display screens in the MLD) and By way of example, communication interface 470 may be couple to wired media (e.g., a wired network, direct-wired connection, etc.) and/or wireless media (e.g., a wireless network, a wireless connection utilizing acoustic, RF, infrared, or other wireless signaling, etc.).

Communication interface 470 may also couple the processing system 400 to one or more input devices 480 (e.g., a keyboard, mouse, pen, voice input device, touch input device, etc.) and/or output devices 490 (e.g., a display, speaker, printer, etc.). The input devices 490 may be used by an observer to manipulate the way information is displayed on an output device 490 and/or what information and/or graphics are displayed in different portion of the output device 490. In one embodiment, communication interface 470 may couple the processing system 400 to a display including three or more display panels arranged in an overlapping manner.

As shown in FIG. 4, a graphics processor 450 may perform graphics/image processing operations on data stored in a frame buffer 460 or another memory of the processing system. Data stored in frame buffer 460 may be accessed, processed, and/or modified by components (e.g., graphics processor 450, processor 410, etc.) of the processing system 400 and/or components of other systems/devices. Additionally, the data may be accessed (e.g., by graphics processor 450) and displayed on an output device coupled to the processing system 400. Accordingly, memory 420, removable storage 440, non-removable storage 445, frame buffer 460, or a combination thereof, may comprise instructions that when executed on a processor (e.g., 410, 450, etc.) implement a method of processing data (e.g., stored in frame buffer 460) for improved display quality on a display.

As shown in FIG. 4, portions of the present invention may be comprised of computer-readable and computer-executable instructions that reside, for example, in a processing system 400 and which may be used as a part of a general purpose computer network (not shown). It is appreciated that processing system 400 is merely exemplary. As such, the embodiment in this application can operate within a number of different systems including, but not limited to, general-purpose computer systems, embedded computer systems, laptop computer systems, hand-held computer systems, portable computer systems, stand-alone computer systems, game consoles, gaming systems or machines (e.g., found in a casino or other gaming establishment), or online gaming systems.

An example embodiment provides a multi-layer display (MLD) system for displaying three-dimensional images with reduced saccadic breakup. The MLD system comprises a multi-layer display unit, and a processing system communicatively coupled to the multi-layer display unit and a head and/or eye tracking device. The processing system is configured to: obtain one or more images; detect head and/or eye movement of a viewer based on information received from the head and/or eye tracking device; determine color saturation values for one or more display fields in the one or more images in accordance with at least the detected head and/or eye movement; adjust the one or more images using the determined color saturation values; and display the adjusted one or more images on the multi-layer display unit.

In the MLD system of the above paragraph, the multi-layer display unit comprises a plurality of display screens including at least first and second display screens arranged in a substantially parallel and overlapping manner, and the processing system is further configured to: generate, from the obtained one or more images, a first image for displaying on the first display screen and a second image for simultaneously displaying on the second display screen; adjust at least one of the first image or the second image using the determined color saturation values; and simultaneously display the adjusted first image on a first display screen and the adjusted second image on the second display screen.

In the MLD system of the above two paragraphs, the adjusting at least one of the first image or the second image using the determined color saturation values includes selecting color saturation values to reduce saccadic breakup.

In the MLD system of the above three paragraphs, the processing system is further configured to determine color saturation values for one or more display fields in each of the first image and the second image in accordance with the detected movement.

In the MLD system of the above four paragraphs the determining color saturation values comprises, for a particular display field from said display fields, determining a first color saturation value and a second color saturation value for use in the first image and the second image respectively, wherein the first and second color saturation values are different.

In the MLD system of the above five paragraphs, a magnitude of the difference is proportional to a rate and/or magnitude of the detected head and/or eye movement.

In the MLD system of the above six paragraphs, at least one of the first color saturation value or the second color saturation value is determined based on a rate and/or magnitude of the detected head and/or eye movement.

In the MLD system of the above seven paragraphs, the at least one of the first color saturation value or the second color saturation value is determined based additionally on a distance between the first display and the second display.

In the MLD system of the above eight paragraphs, the first display screen and the second display screen are monochrome displays of respectively different colors.

In the MLD system of above nine paragraphs, the simultaneously displaying the adjusted first image on the first display screen and the adjusted second image on the second display screen comprises flashing a color saturation adjusted display field to respective ones of said monochrome displays in quick succession.

In the MLD system of the above ten paragraphs, the processing system is configured to perform said obtaining the one or more images concurrently with the detecting.

In the MLD system of the above eleven paragraphs, the multi-layer display unit further comprises a light source configured to provide light to at least one of the display screens.

In the MLD system of the above twelve paragraphs, the head and/or eye tracking device, the processing system and the multi-layer display unit are in a same housing.

In the MLD system of the above thirteen paragraphs, the head and/or eye tracking device is attached to the multi-layer display unit.

An example embodiment provides a method for displaying three-dimensional images with reduced saccadic breakup on a multi-layer display unit. The method comprises obtaining one or more images; detecting head and/or eye movement of a viewer; determining color saturation values for one or more display fields in the one or more images in accordance with at least the detected head and/or eye movement; adjusting the one or more images using the determined color saturation values; and displaying the adjusted one or more images on the multi-layer display unit.

The method of the above paragraph, further includes generating, from the obtained one or more images, a first image for displaying on a first display screen and a second image for simultaneously displaying on a second display screen, the first and second display screens arranged in the multi-layer display unit in a substantially parallel and overlapping manner; adjusting at least one of the first image or the second image using the determined color saturation values; and simultaneously displaying the adjusted first image on a first display screen and the adjusted second image on the second display screen.

The method of the above two paragraphs, the adjusting at least one of the first image or the second image using the determined color saturation values includes selecting color saturation values to reduce saccadic breakup.

The method of the above three paragraphs, the simultaneously displaying the adjusted first image on the first display screen and the adjusted second image on the second display screen comprises flashing a color saturation adjusted display field to respective monochrome displays in the multi-layer display unit in quick succession.

An example embodiment provides a non-transitory computer readable storage medium storing computer program instructions which, when executed by a processor of a multi-layer display system for displaying three-dimensional images with reduced saccadic breakup, causes the multi-layer display system to perform operations comprising: obtaining one or more images; detecting head and/or eye movement of a viewer; determining color saturation values for one or more display fields in the one or more images in accordance with at least the detected head and/or eye movement; adjusting the one or more images using the determined color saturation values; and displaying the adjusted one or more images on the multi-layer display unit.

The exemplary embodiments of the present disclosure provide the invention(s), including the best mode, and also to enable a person skilled in the art to practice the invention, including making and using any devices or systems and performing any incorporated methods. While specific exemplary embodiments of the present invention(s) are disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s).

The invention claimed is:

1. A multi-layer display system for displaying three-dimensional images with reduced saccadic breakup, comprising:
 a multi-layer display unit comprising multiple display panels; and
 a processing system communicatively coupled to the multi-layer display unit and a head and/or eye tracking device, and comprising at least one processor and memory, the processing system configured to:
  obtain one or more images;
  detect head and/or eye movement of a viewer based on information received from the head and/or eye tracking device;
  determine color saturation values for one or more display fields in the one or more images based on at least one of the detected head and/or eye movement;
  adjust the one or more images using the determined color saturation values; and
  display the adjusted one or more images on the multi-layer display unit;
 wherein the multi-layer display unit comprises a plurality of display panels including at least first and second display panels arranged in a substantially parallel and overlapping manner, and
 wherein the processing system is further configured to:
  generate, from the obtained one or more images, a first image for displaying on the first display panel and a second image for simultaneously displaying on the second display panel;
  adjust at least one of the first image or the second image using the determined color saturation values; and
  simultaneously display the adjusted first image on the first display panel and the adjusted second image on the second display panel;
 wherein the determining color saturation values comprises, for a particular display field from said display fields, determining a first color saturation value and a second color saturation value for use in the first image and the second image respectively, wherein the first and second color saturation values are different; and
 wherein a magnitude of the difference is proportional to a rate and/or magnitude of the detected head and/or eye movement.

2. The multi-layer display system according to claim 1, wherein said adjusting at least one of the first image or the second image using the determined color saturation values includes selecting color saturation values to reduce saccadic breakup.

3. The multi-layer display system according to claim 2, wherein the processing system is further configured to determine color saturation values for one or more display fields in each of the first image and the second image in accordance with the detected movement.

4. The multi-layer display system according to claim 1, wherein at least one of the first color saturation value or the second color saturation value is determined based on a rate and/or magnitude of the detected head and/or eye movement.

5. The multi-layer display system according to claim 4, wherein said at least one of the first color saturation value or the second color saturation value is determined based additionally on a distance between the first display and the second display.

6. The multi-layer display system according to claim 1, wherein the first display screen and the second display screen are monochrome displays of respectively different colors.

7. The multi-layer display system according to claim 6, said simultaneously displaying the adjusted first image on the first display screen and the adjusted second image on the second display screen comprises flashing a color saturation adjusted display field to respective ones of said monochrome displays in quick succession.

8. The multi-layer display system according to claim 1, wherein the processing system is configured to perform said obtaining the one or more images concurrently with the detecting.

9. The multi-layer display system according to claim 1, wherein the multi-layer display unit further comprises a light source configured to provide light to at least one of the display screens.

10. The multi-layer display system according to claim 1, wherein the head and/or eye tracking device, the processing system and the multi-layer display unit are in a same housing.

11. The multi-layer display system according to claim 1, wherein the head and/or eye tracking device is attached to the multi-layer display unit.

12. A method for displaying three-dimensional images with reduced saccadic breakup on a multi-layer display unit including multiple display screens, the method comprising:
 obtaining one or more images;
 detecting head and/or eye movement of a viewer;
 determining color saturation values for one or more display fields in the one or more images based on at least the detected head and/or eye movement;
 the method further comprising:

generating, from the obtained one or more images, a first image for displaying on the first display panel and a second image for simultaneously displaying on the second display panel;

adjusting at least one of the first image or the second image using the determined color saturation values; and simultaneously display the adjusted first image on the first display panel and the adjusted second image on the second display panel;

wherein the determining color saturation values comprises determining a first color saturation value and a second color saturation value for use in the first image and the second image respectively, wherein the first and second color saturation values are different; and wherein a magnitude of the difference is proportional to a rate and/or magnitude of the detected head and/or eye movement.

13. The method according to claim 12, wherein said adjusting at least one of the first image or the second image using the determined color saturation values includes selecting color saturation values to reduce saccadic breakup.

14. The method according to claim 12, wherein said simultaneously displaying the adjusted first image on the first display screen and the adjusted second image on the second display screen comprises flashing a color saturation adjusted display field to respective monochrome displays in the multi-layer display unit in quick succession.

15. A non-transitory computer readable storage medium storing computer program instructions which, when executed by a processor of a multi-layer display system for displaying three-dimensional images with reduced saccadic breakup, causes the multi-layer display system to perform operations comprising:

obtaining one or more images;

detecting head and/or eye movement of a viewer;

determining color saturation values for one or more display fields in the one or more images based on at least the detected head and/or eye movement;

generating, from the obtained one or more images, a first image for displaying on the first display panel and a second image for simultaneously displaying on the second display panel;

adjusting at least one of the first image or the second image using the determined color saturation values; and simultaneously display the adjusted first image on the first display panel and the adjusted second image on the second display panel;

wherein the determining color saturation values comprises determining a first color saturation value and a second color saturation value for use in the first image and the second image respectively, wherein the first and second color saturation values are different; and wherein a magnitude of the difference is proportional to a rate and/or magnitude of the detected head and/or eye movement.

* * * * *